(12) United States Patent
Roberts et al.

(10) Patent No.: US 10,213,883 B2
(45) Date of Patent: Feb. 26, 2019

(54) SYSTEM AND METHOD FOR IN SITU REPAIR OF GAS TURBINE ENGINE CASING CLEARANCE

(71) Applicant: General Electric Company, Schenectady, NY (US)

(72) Inventors: Herbert Chidsey Roberts, Middletown, OH (US); David Scott Diwinsky, West Chester, OH (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 15/049,182

(22) Filed: Feb. 22, 2016

(65) Prior Publication Data
US 2017/0239762 A1    Aug. 24, 2017

(51) Int. Cl.
*F01D 5/00*    (2006.01)
*B23P 6/04*    (2006.01)
(Continued)

(52) U.S. Cl.
CPC ............ *B23P 6/045* (2013.01); *B26F 3/12* (2013.01); *B29C 73/02* (2013.01); *F01D 5/005* (2013.01); *F01D 25/24* (2013.01); *F01D 25/285* (2013.01); *F04D 29/526* (2013.01); *B29C 2073/266* (2013.01); *F01D 11/122* (2013.01); *F05B 2220/302* (2013.01); *F05B 2230/80* (2013.01); *F05B 2280/106* (2013.01); *F05B 2280/1073* (2013.01); *F05B 2280/2003* (2013.01); *F05B 2280/4004* (2013.01); *F05D 2250/75* (2013.01);
(Continued)

(58) Field of Classification Search
None
See application file for complete search history.

(56) References Cited

U.S. PATENT DOCUMENTS 2,946,118 A    7/1960  Steck
3,709,632 A    1/1973  Emmerson et al.
(Continued)

FOREIGN PATENT DOCUMENTS

EP    1 975 271 A2    10/2008
EP    2 946 870 A1    11/2015
(Continued)

OTHER PUBLICATIONS

Extended European Search Report and Opinion issued in connection with corresponding EP Application No. 17156955.1 dated Jul. 25, 2017.

*Primary Examiner* — Jacob J Cigna
(74) *Attorney, Agent, or Firm* — General Electric Company; Brian Overbeck

(57) ABSTRACT

The present disclosure is directed to a system and method for repairing an abradable material coated on a casing of a gas turbine engine. The system includes an articulating guide configured to fit into an access port of the gas turbine engine. Further, the articulating guide has a proximal end and a distal end. The system also includes a repair tool configured at a distal end of the articulating guide. The repair tool includes a body having a proximal end and a shaped distal end, with the shaped distal end extending away from the body. Thus, the shaped distal body is configured to trench out an area of the abradable material comprising a defect. The system also includes a filler material for filling the trenched out area.

18 Claims, 6 Drawing Sheets

(51) Int. Cl.
  *F04D 29/52* (2006.01)
  *B29C 73/02* (2006.01)
  *F01D 25/24* (2006.01)
  *B26F 3/12* (2006.01)
  *F01D 25/28* (2006.01)
  *F01D 11/12* (2006.01)
  *B29C 73/26* (2006.01)

(52) U.S. Cl.
  CPC .... *F05D 2300/15* (2013.01); *F05D 2300/173* (2013.01); *F05D 2300/431* (2013.01); *F05D 2300/437* (2013.01); *F05D 2300/44* (2013.01); *F05D 2300/613* (2013.01)

(56) References Cited

U.S. PATENT DOCUMENTS

| | | | |
|---|---|---|---|
| 4,409,717 A | 10/1983 | Boozer | |
| 4,581,802 A | 4/1986 | Castoe | |
| 4,589,175 A | 5/1986 | Arrigoni | |
| 5,102,221 A * | 4/1992 | Desgranges | B23Q 5/027 356/241.1 |
| 5,349,940 A * | 9/1994 | Takahashi | A61B 17/32002 356/241.4 |
| 5,655,701 A | 8/1997 | Quattrocchi et al. | |
| 5,803,680 A * | 9/1998 | Diener | B23Q 17/2404 356/241.1 |
| 5,913,555 A | 6/1999 | Richter et al. | |
| 6,004,620 A * | 12/1999 | Camm | B23P 6/002 427/142 |
| 6,010,746 A * | 1/2000 | Descoteaux | B23K 20/002 427/140 |
| 7,032,279 B2 | 4/2006 | McCarvill et al. | |
| 7,097,539 B2 * | 8/2006 | Moeller | B24B 19/14 451/356 |
| 7,278,208 B2 | 10/2007 | Le Saint et al. | |
| 7,353,579 B2 | 4/2008 | Piccioni | |
| 7,449,658 B2 | 11/2008 | Mielke | |
| 7,766,726 B2 | 8/2010 | Sherlock et al. | |
| 8,039,773 B2 | 10/2011 | Spallek et al. | |
| 8,100,640 B2 | 1/2012 | Strock et al. | |
| 8,371,009 B2 | 2/2013 | Xie et al. | |
| 8,563,080 B2 * | 10/2013 | Hopkins | C23C 4/06 427/140 |
| 8,613,590 B2 | 12/2013 | Belanger et al. | |
| 8,839,516 B2 | 9/2014 | Bertoli et al. | |
| 8,840,366 B2 | 9/2014 | Minor et al. | |
| 9,056,371 B2 | 6/2015 | Czerner | |
| 9,073,156 B2 * | 7/2015 | Clark | F01D 21/003 |
| 9,403,244 B2 * | 8/2016 | Rautenberg | B23P 6/002 |
| 9,703,090 B2 * | 7/2017 | Kell | G02B 23/2469 |
| 2008/0006301 A1 * | 1/2008 | Garry | B08B 3/024 134/22.18 |
| 2008/0233278 A1 * | 9/2008 | Hopkins | C23C 4/06 427/142 |
| 2011/0241295 A1 * | 10/2011 | Voisine | F01D 11/001 277/500 |
| 2012/0286109 A1 * | 11/2012 | Clark | F01D 21/003 248/70 |
| 2014/0079538 A1 | 3/2014 | Ekanayake et al. | |
| 2014/0260755 A1 * | 9/2014 | Dong | B25J 18/06 74/490.04 |
| 2015/0209915 A1 | 7/2015 | Rautenberg et al. | |
| 2015/0309302 A1 * | 10/2015 | Kell | B23K 26/0066 250/227.11 |
| 2016/0251975 A1 * | 9/2016 | Strock | C23C 4/06 415/173.4 |

FOREIGN PATENT DOCUMENTS

| | | |
|---|---|---|
| WO | 2015/048700 A2 | 4/2015 |
| WO | 2015/053948 A1 | 4/2015 |

* cited by examiner

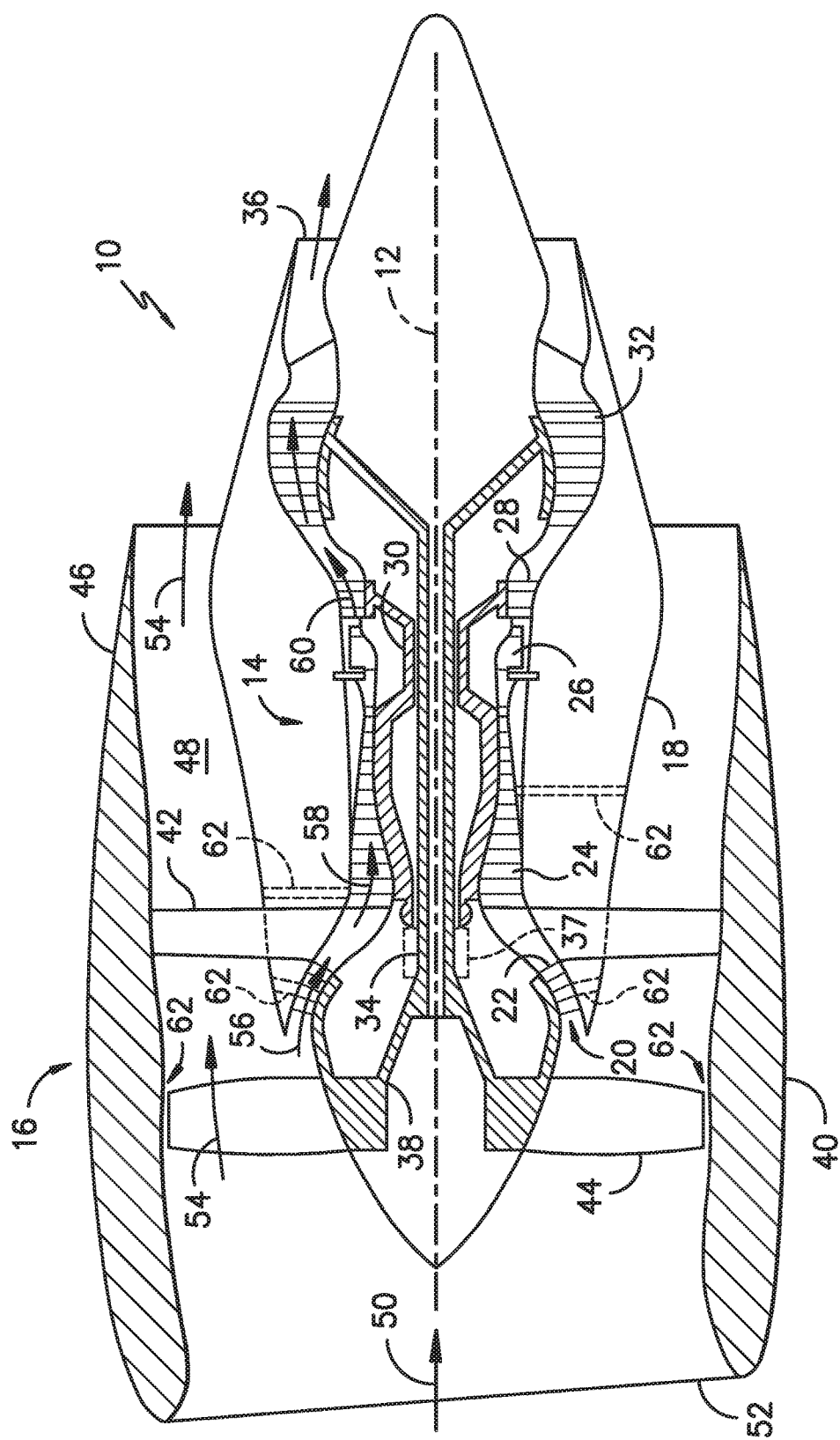
FIG. -1-

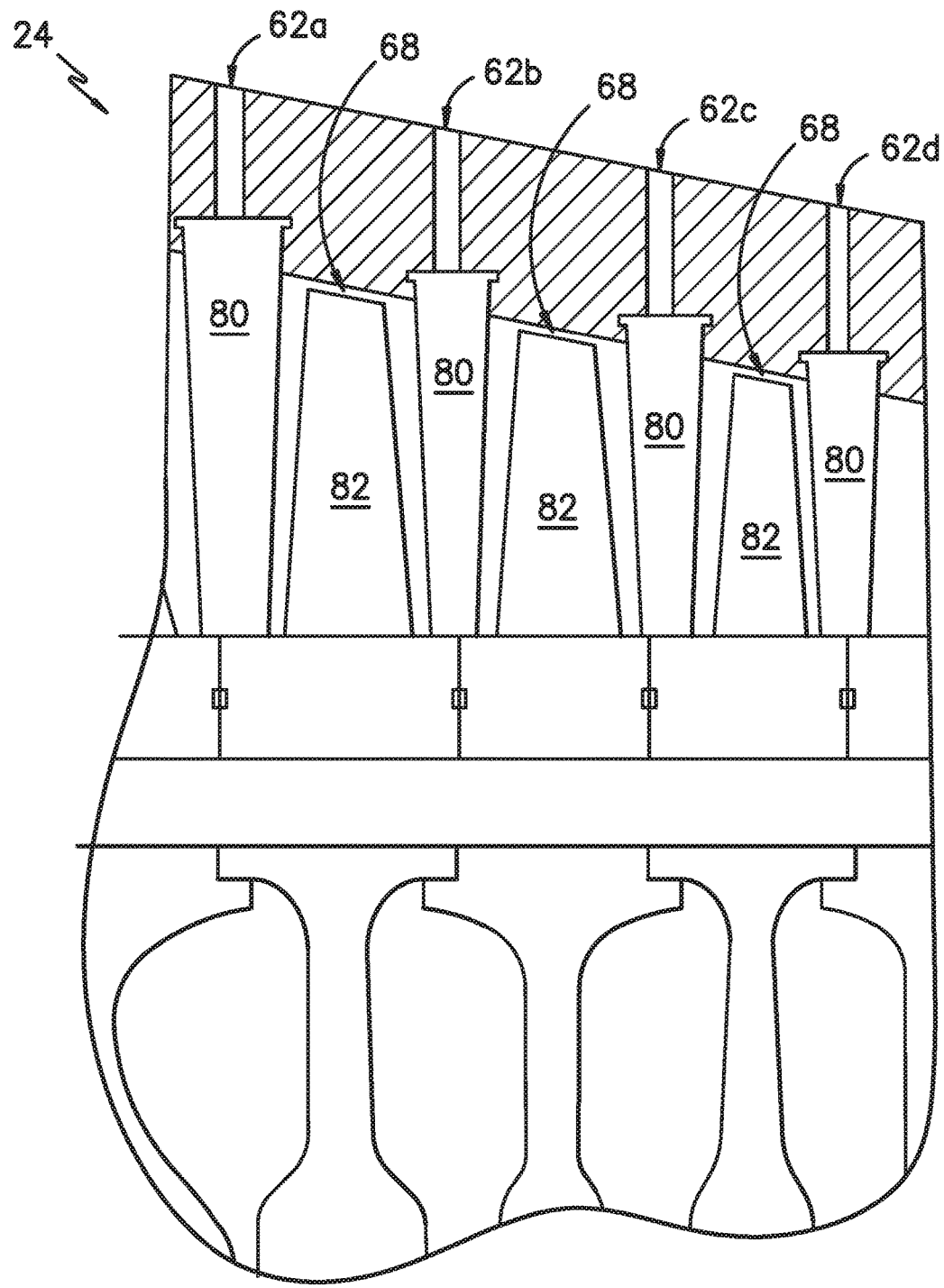
FIG. -2-

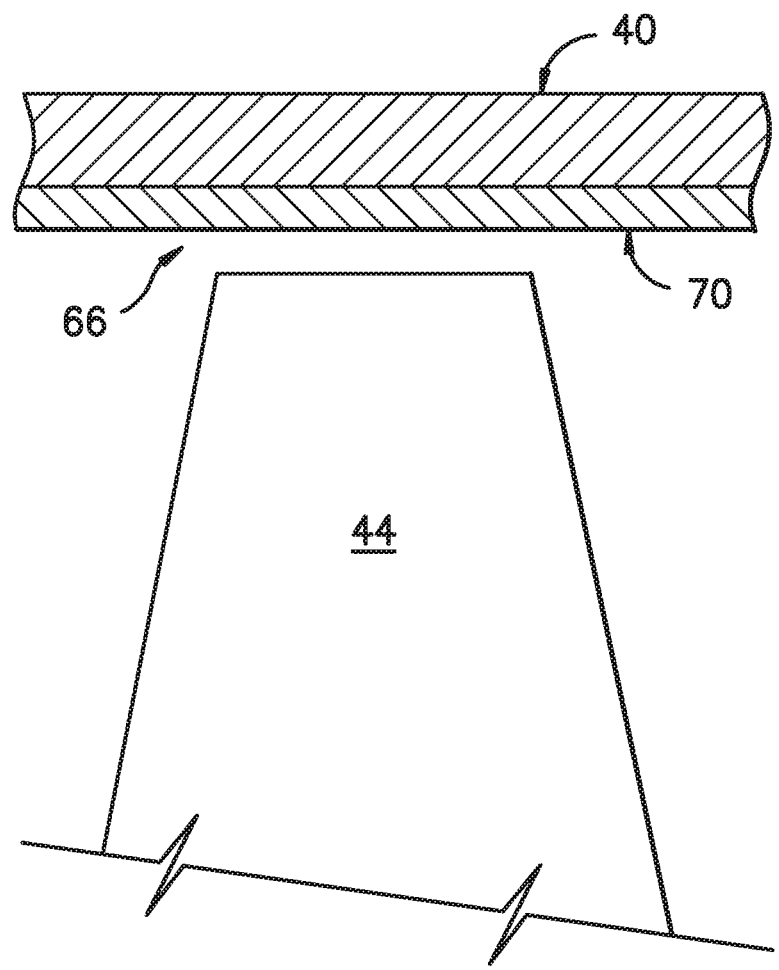
FIG. -3-

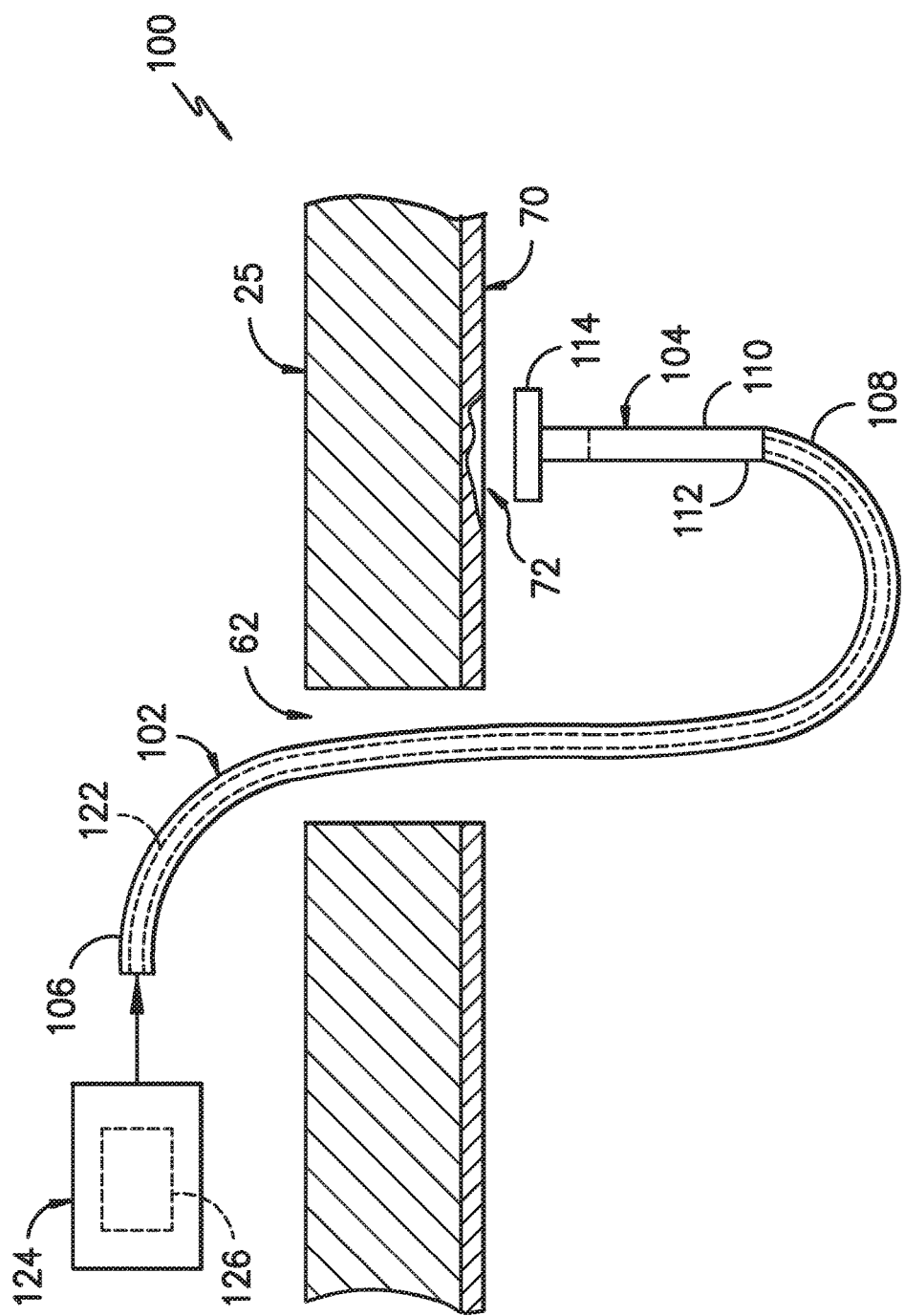
FIG. -4-

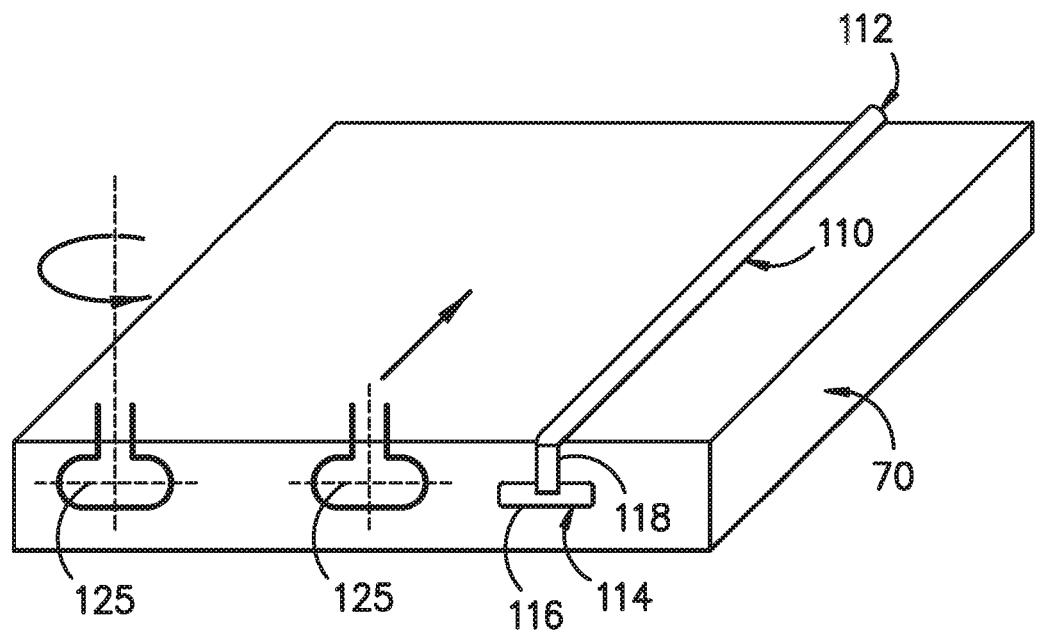
FIG. -5-
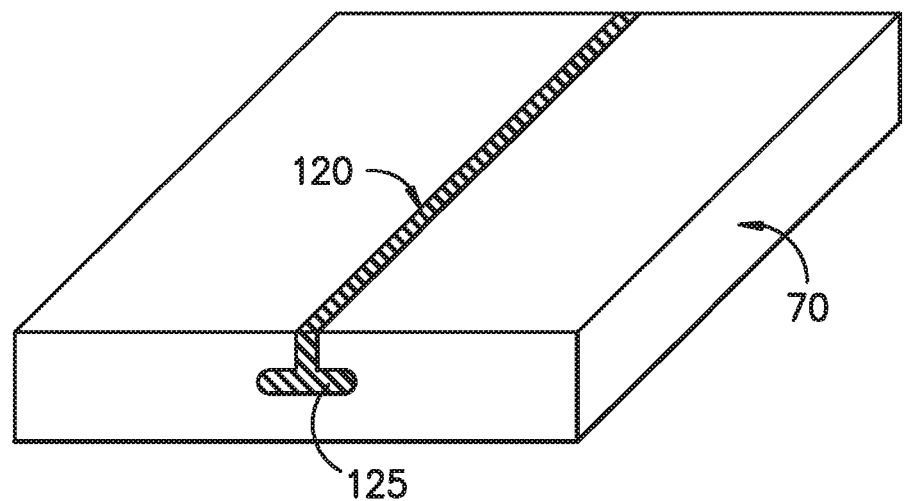
FIG. -6-

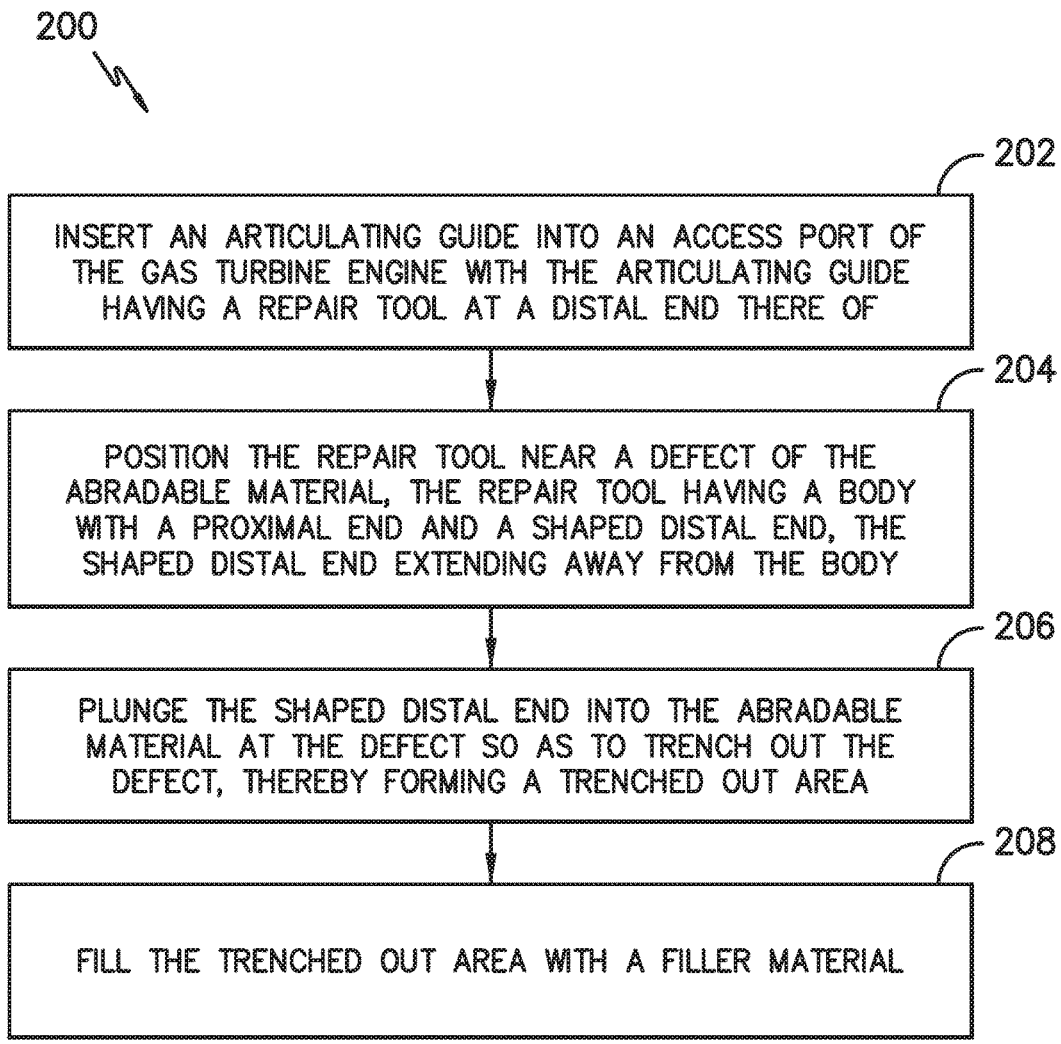
FIG. -7-

SYSTEM AND METHOD FOR IN SITU REPAIR OF GAS TURBINE ENGINE CASING CLEARANCE

FIELD OF THE INVENTION

The present invention relates generally to gas turbine engines, and more specifically, to systems and methods for in-situ repair of gas turbine fan/compressor casing clearance.

BACKGROUND OF THE INVENTION

A gas turbine engine generally includes, in serial flow order, a fan section, a compressor section, a combustion section, a turbine section and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as a rotor shaft, rotor disks mounted or otherwise carried by the rotor shaft, turbine blades mounted to and radially extending from the periphery of the disks, and various stationary turbine components such as stator vanes or nozzles, turbine shrouds, and engine frames. The rotatable and stationary turbine components at least partially define the hot gas path through the turbine section. For example, the gas turbine buckets or blades generally have an airfoil shape designed to convert the thermal and kinetic energy of the flow path gases into mechanical rotation of the rotor. As the combustion gases flow through the hot gas path, thermal energy is transferred from the combustion gases to the rotatable and stationary turbine components. Such gas turbine engines are commonly employed on an aircraft.

In addition, the fan section generally includes a rotatable, axial-flow fan rotor assembly that is configured to be surrounded by an annular fan casing. Thus, the fan casing may enclose the fan rotor assembly and its corresponding fan rotor blades. Further, the compressor section includes a plurality of compressor stages, with each stage including both an annular array of compressor vanes fixed to an outer casing and an annular array of rotatable compressor blades. During operation, it is common for the fan and/or compressor casings to include abradable materials (e.g. rubber) to help control the gap or clearance between the static gas turbine parts and the rotating blades.

Over time, such abradable materials can locally spall or lose material due to erosion or the ingestion of materials into the gas turbine engine. Conventional methods for repairing the abradable materials have focused on a full strip and recoating of the abradable material, which can be both time-consuming and expensive.

In view of the aforementioned, an improved system and method for in-situ (i.e. on-wing) repairing of such abradable materials would be advantageous. More specifically, a system and method for repairing the abradable material of the fan and/or compressor casing using a local in-situ repair tool would be desired in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a system for repairing an abradable material coated on a casing of a gas turbine engine. The system includes an articulating guide configured to fit into an access port of the gas turbine engine. Further, the articulating guide has a proximal end and a distal end. The system also includes a repair tool configured at a distal end of the articulating guide. The repair tool includes a body having a proximal end and a shaped distal end, with the shaped distal end extending away from the body. Thus, the shaped distal body is configured to trench out an area of the abradable material containing a defect. The system also includes a filler material for filling the trenched out area.

In another aspect, the present disclosure is directed to a method for repairing an abradable material coated on a casing of a gas turbine engine. The method includes inserting an articulating guide into an access port of the gas turbine engine, with the articulating guide having a repair tool at a distal end thereof. The method also includes positioning the repair tool near a defect of the abradable material. More specifically, the repair tool has a body with a proximal end and a shaped distal end, with the shaped distal end extending away from the body. Thus, the method also includes plunging the shaped distal end into the abradable material at the defect so as to trench out the defect, thereby forming a trenched out area. Further, the method includes filling the trenched out area with a filler material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 1 illustrates a cross-sectional view of one embodiment of a gas turbine engine that may be utilized within an aircraft in accordance with aspects of the present subject matter;

FIG. 2 illustrates a partial, cross-sectional view of one embodiment of a compressor suitable for use within the gas turbine engine shown in FIG. 1, particularly illustrating the gaps or clearance between the compressor blades and the compressor casing;

FIG. 3 illustrates a partial, cross-sectional view of one embodiment of a fan casing suitable for use within the gas turbine engine shown in FIG. 1, particularly illustrating the abradable material within a gap or clearance between the fan blade and the fan casing;

FIG. 4 illustrates a simplified view of one embodiment of a system for repairing an abradable material coated on a casing of a gas turbine engine according to the present disclosure, particularly illustrating a repair tool inserted through an access port of the engine to access a defect of the abradable material;

FIG. 5 illustrates a perspective view of one embodiment of a repair tool repairing an abradable material according to the present disclosure;

FIG. 6 illustrates a perspective view of one embodiment of a repaired defect of an abradable material according to the present disclosure; and FIG. 7 illustrates a flow diagram of one embodiment of a method for repairing an abradable material coated on a casing of a gas turbine engine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to an improved system and method for repairing an abradable material coated on a casing of a gas turbine engine. The system includes an articulating guide configured to fit into an access port of the gas turbine engine. The system also includes a repair tool configured at a distal end of the articulating guide. More specifically, the repair tool includes a body having a proximal end and a shaped distal end, with the shaped distal end extending away from the body. Thus, the shaped distal body is configured to trench out an area of the abradable material comprising a defect. The system also includes a filler material for filling the trenched out area.

It should be appreciated that the disclosed system and method may generally be used to perform in situ repairs of gas turbine engines, including aircraft-based turbine engines and land-based turbine engines, regardless of the engine's current assembly state (e.g., fully or partially assembled). Additionally, with reference to aircraft engines, it should be appreciated that the present subject matter may be implemented on-wing or off-wing.

Thus, the present disclosure provides many advantages not present in the prior art. For example, when servicing a gas turbine engine, some repair activities have focused on a full strip and recoat of the abradable material. Thus, the in situ repairs of the present disclosure lower the service time and cost associated with repairing damaged blades. More specifically, by using a set of specifically shaped tools that have the ability to be heated through resistance heating or sharpened to form a set of cutting edges, the repair tool of the present disclosure can be used to trench out a section of the existing abradable material through mechanical displacement or rotation, and may be assisted by including ultrasonic vibration. As such, the repair tool provides a region that new filler material can be bonded into place. Thus, the present disclosure provides a simple repair method, thereby making in-situ repairs of turbine blades easy and efficient.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only four of which are shown) defined through the outer casing 18 for providing internal access to one or both of the compressors 22, 24. In several embodiments, the access ports 62 may be spaced apart axially along the core engine 14. For instance, the access ports 62 may be spaced apart axially along each compressor 22, 24 such that at least one access port 62 is located at each compressor stage for providing access to the internal components located at such stage(s). In addition, the access ports 62 may also be spaced apart circumferentially around the core engine 14. For instance, a plurality of access ports 62 may be spaced apart circumferentially around each compressor stage.

It should be appreciated that, although the access ports 62 are generally described herein with reference to providing internal access to one or both of the compressors 22, 24, the gas turbine engine 10 may include access ports 62 providing access to any suitable internal location of the engine 10, such as by including access ports 62 that provide access within the combustor 26, the turbines 28, 32, and/or any other suitable component of the engine 10.

Referring now to FIG. 2, a partial, cross-sectional view of the high pressure compressor 24 described above with reference to FIG. 1 is illustrated in accordance with embodiments of the present subject matter. As shown, the compressor 24 may include a plurality of compressor stages, with each stage including both an annular array of compressor vanes 80 fixed to a compressor casing 25 (only one of which is shown for each stage) and an annular array of rotatable compressor blades 82 (only one of which is shown for each stage) that rotate within the compressor casing 25. Each row of compressor vanes 80 is generally configured to direct air flowing through the compressor 24 to the row of compressor blades 82 immediately downstream thereof.

Moreover, the compressor 24 may include a plurality of access ports 62 defined through the compressor casing/frame, with each access port 62 being configured to provide access to the interior of the compressor 24 at a different axial location. Specifically, in several embodiments, the access ports 62 may be spaced apart axially such that each access port 62 is aligned with or otherwise provides interior access to a different stage of the compressor 24. For instance, as shown in FIG. 2, first, second, third and fourth access ports 62a, 62b, 62c, 62d are illustrated that provide access to four successive stages, respectively, of the compressor 24.

It should be appreciated that similar access ports 62 may also be provided for any of the other stages of the compressor 24 and/or for any of the stages of the low pressure compressor 22. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the compressor casing/frame at each compressor stage to provide interior access to the compressor 24 at multiple circumferential locations around the compressor stage.

During operation of the gas turbine engine 10, it is common for the fan casing 40 and/or the compressor casing 25 to include abradable materials (e.g. rubber) to help control the gap (e.g. gaps 66, 68) or clearance between the static gas turbine parts and the rotating blades, i.e. fan blades 44 and compressor blades 82, respectively. For example, as shown in FIG. 3, a detailed, cross-sectional view of one embodiment of a portion of the fan casing 40 is illustrated, particularly illustrating an abradable material 70 within the gap 66 between the fan casing 40 and the fan blade 44. Over time, the abradable material 70 can locally spall or lose material due to erosion or the ingestion of materials into the gas turbine engine 10. As such, the present disclosure is directed to an improved system and method for repairing such abradable materials in the event that the materials become damaged.

More specifically, as shown in FIG. 4, a simplified view of one embodiment of a system 100 for repairing an abradable material coated on a casing of a gas turbine engine 10 according to the present disclosure is illustrated. In certain embodiments, the casing may include a fan casing 40, a compressor casing 18, or any other casing of the gas turbine engine 10 containing an abradable coating 70. Further, the abradable material may include any suitable material on a surface of the casing, including but not limited to a resin obtained by room-temperature sintered metal fiber material such as FELTMETAL, alloy Y and LUCITE, or similar. Thus, as shown, the system 100 is configured to repair a defect 72 in the abradable material 70 of the gas turbine engine 10. Further, as shown, the system 100 includes an articulating guide 102 configured to fit into an access port 62 of the compressor casing 25 and/or an inlet 52 of the gas turbine engine 10. The articulating guide 102 as described herein may include any suitable guide or arm configured to fit within various ports 62 and/or the inlet 52 of the engine 10. For example, in one embodiment, the articulating guide 102 may include a snake-arm robot. In addition, as shown, the system 100 includes a repair tool 104. More specifically, the articulating guide 102 has a proximal end 106 and distal end 108. Thus, as shown, the repair tool 104 is configured with the distal end 108 of the articulating guide 102 such that the tool 104 can be easily inserted through an access port 62 of the gas turbine engine 10, such as any of the access ports 62 described above with reference to FIGS. 1-2, to allow an in situ repair procedure to be performed within the gas turbine engine 10.

Further, as shown in FIGS. 4-5, the repair tool 104 includes a body 110 having a proximal end 112 and a shaped distal end 114, with the shaped distal end 114 extending away from the body 110. In certain embodiments, the body 110 of the repair tool 104 may be a wire. Thus, the shaped distal body 114 is configured to trench out an area of the abradable material 70 containing the defect 72. More specifically, as shown, the shaped distal end 114 may include a varying cross-section having a first portion 116 and second portion 118, with the first portion 116 having a larger cross-sectional area than the second portion 118. As such, when the repair tool 104 is plunged into the abradable material 70, the first portion 116 of the shaped distal end 114 is configured to create a trenched area within the abradable material 70 for a filler material that cannot escape from the trenched area, which will be described in more detail below.

More particularly, in certain embodiments, the shaped distal end 114 may include a unique cross-section having any suitable varying shape, such as for example, an I-shaped cross-section, a T-shaped cross-section, a V-shaped cross-section, an L-shaped cross-section, or similar. For example, as generally shown in the figures, the shaped distal end 114 has a T-shaped cross-section. In additional embodiments, the shaped distal end 114 may also include sharpened edges configured to cut the abradable material 70 when inserted therethrough. Thus, the defected material may be removed through mechanical displacement and/or rotation and may be assisted by including ultrasonic vibration.

In certain embodiments, the body 110, i.e. the wire, may be heated and/or vibrated such that the wire can be easily plunged into the abradable material 70. For example, as shown, in FIG. 4, the articulating guide 102 may include a heating or vibrating element 122 configured to locally heat or vibrate the repair tool 104 before, during, and/or after plunging the wire into the abradable material 70. For example, the heating element 122 may direct thermal energy into the repair tool 104. Further, as shown in FIG. 4, the heating elements (indicated by dashed lines 122) may be provided in operative association within the articulating guide 102.

In general, the heating element(s) 122 may be configured to generate heat within the articulating guide 102. For example, in one embodiment, the heating element(s) 122 may correspond to a resisting heating element(s), such as one or more resistance wires, that is integrated into or incorporated within a wall(s) of the articulating guide 102. However, in another embodiment, the heating element(s) 122 may correspond to any other suitable heat generating device(s) and/or component(s) that may be used to provide heating within the articulating guide 102. Thus, the heated wire is configured to heat the abradable material 70 as the shaped distal end 114 trenches out the area of the abradable material containing the defect 72.

After trenching out the area of the abradable material 70 containing the defect 72, the system 100 also includes a filler material 120 for filling the trenched area 125 as shown in FIG. 6. For example, in one embodiment, the system 100 may deliver the filler material 120 via the articulating guide 102 or similar tubing, i.e. by removing the repair tool 104 and replacing the tool 104 with a filler head (not shown). More specifically, in certain embodiments, the filler material 120 may include any suitable replacement material, including but not limited to a resin obtained by room-temperature vulcanization (RTV), rubber, aluminum-bronze with polyester, aluminum-silicone with polyester, alloy Y and LUCITE, or similar. Further, it should be understood that the filler material 120 may be the same or different than the original abradable material.

Referring still to FIG. 4, the articulating guide 102 may also include an articulation assembly 124 that allows the orientation of the repair tool 104 to be adjusted within the interior of the gas turbine engine 10. For example, the articulation assembly 124 may allow for the repair tool 104 to be rotated or pivoted about a single axis or multiple axes to adjust the orientation of the repair tool 104 relative to the abradable material 70. It should be appreciated that the articulation assembly 124 may generally have any suitable configuration and/or may include any suitable components that allow for adjustment of the orientation of the repair tool 104 relative to the abradable material 70. For example, in one embodiment, a plurality of articulation cables may be coupled between the repair tool 104 and one or more articulation motors 126. In such an embodiment, by adjusting the tension of the cables via the motor(s) 126, the repair tool 104 may be reoriented within the gas turbine engine 10.

Referring now to FIG. 7, a flow diagram of one embodiment of a method 200 for repairing an abradable material coated on a casing of a gas turbine engine 10 is illustrated. As shown at 202, the method 200 includes inserting an articulating guide 102 into an access port 62 of the gas turbine engine 10, with the articulating guide 102 having a repair tool 104 at a distal end 108 thereof. As shown at 204, the method 200 includes positioning the repair tool 104 near a defect 72 of the abradable material 70 (FIG. 4). More specifically, as mentioned, the repair tool 104 has a body 110 with a proximal end 112 and a shaped distal end 114, with the shaped distal end 114 extending away from the body 110. Thus, as shown at 206, the method 200 includes plunging the shaped distal end 114 into the abradable material 70 at the defect 72 so as to trench out the defect 72, thereby forming a trenched out area 125. As shown at 208, the method 200 includes filling the trenched out area 125 with a filler material (FIG. 6).

In one embodiment, as shown in FIG. 5 (middle), the method 200 may include dragging the repair tool 104 through the abradable material 70 after plunging the shaped distal end 114 into the abradable material. Alternatively or in addition, the method 200 may include rotating the repair tool 104 in place in the abradable material 70 after plunging the shaped distal end into the abradable material, for example, as shown in FIG. 5 (left). Thus, the defected material may be removed through mechanical displacement and/or rotation, and may be assisted though including ultrasonic vibration.

In another embodiment, wherein the body 110 of the repair tool 114 is constructed of a wire, the method 200 may include heating, via a heating element 122, the wire of the repair tool 104, and heating the abradable material 70 via the heated wire as the shaped distal end 114 is plunged into the abradable material 70.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for repairing an abradable material coated on a casing of a gas turbine engine, the system comprising: an articulating guide configured to fit into an access port of the gas turbine engine, the articulating guide comprising a proximal end and a distal end; a repair tool configured at a distal end of the articulating guide, the repair tool comprising a body having a proximal end and a shaped distal end, the shaped distal end extending away from the body and configured to trench out an area of the abradable material comprising a defect; and a filler material for filling the trenched out area, wherein the filler material comprises at least one of a resin obtained by room-temperature vulcanization (RTV), rubber, aluminum-bronze with polyester, aluminum-silicone with polyester, or alloy Y and LUCITE.

2. The system of claim 1, wherein the shaped distal end comprises sharpened edges configured to cut the abradable material.

3. The system of claim 1, wherein the abradable material comprises at least one of a resin obtained by room-temperature vulcanization (RTV), rubber, aluminum-bronze with polyester, aluminum-silicone with polyester, or alloy Y and LUCITE.

4. The system of claim 1, wherein the casing comprises at least one of a fan casing or a compressor casing of the gas turbine engine.

5. The system of claim 1, wherein the shaped distal end comprises a varying cross-section having a first portion and second portion, wherein the first portion comprises a larger cross-sectional area than the second portion.

6. The system of claim 5, wherein the shaped distal end comprises at least one of an I-shaped cross-section, a T-shaped cross-section, a V-shaped cross-section, or an L-shaped cross-section.

7. The system of claim 1, wherein the body of the repair tool comprises a wire.

8. The system of claim 7, further comprising at least one of a heating element or a vibration element configured to heat or vibrate the wire.

9. The system of claim 8, wherein the heated wire is configured to heat the abradable material as the shaped distal end trenches out the area of the abradable material comprising the defect.

10. A method for repairing an abradable material coated on a casing of a gas turbine engine, the method comprising: inserting an articulating guide into an access port of the gas turbine engine, the articulating guide having a repair tool at a distal end thereof; positioning the repair tool near a defect of the abradable material, the repair tool having a body with a proximal end and a shaped distal end, the shaped distal end extending away from the body; plunging the shaped distal end into the abradable material at the defect so as to trench out the defect, thereby forming a trenched out area; and filling the trenched out area with a filler material, wherein the filler material comprises at least one of a resin obtained by room-temperature vulcanization (RTV), rubber, aluminum-bronze with polyester, aluminum-silicone with polyester, or alloy Y and LUCITE.

11. The method of claim 10, further comprising after plunging the shaped distal end into the abradable material, dragging the repair tool through the abradable material.

12. The method of claim 10, further comprising after plunging the shaped distal end into the abradable material, rotating the repair tool in place in the abradable material.

13. The method of claim 10, wherein the shaped distal end comprises at least one of an I-shaped cross-section, a T-shaped cross-section, or an L-shaped cross-section.

14. The method of claim 10, wherein the shaped distal end comprises sharpened edges configured to cut the abradable material when plunging the shaped distal end into the abradable material.

15. The method of claim 10, wherein the abradable material comprises a least one of a resin obtained by room-temperature vulcanization (RTV), rubber, aluminum-bronze with polyester, aluminum-silicone with polyester, or alloy Y and LUCITE.

16. The method of claim 10, wherein the casing comprises at least one of a fan casing or a compressor casing of the gas turbine engine.

17. The method of claim 10, wherein the body of the repair tool comprises a wire.

18. The method of claim 17, further comprising:
heating, via a heating element, the wire of the repair tool,
heating, via the heated wire, the abradable material as the shaped distal end is plunged into the abradable material.

* * * * *